United States Patent
Kumar et al.

(10) Patent No.: US 11,797,075 B2
(45) Date of Patent: *Oct. 24, 2023

(54) REDUCING POWER CONSUMPTION OF COMMUNICATION INTERFACES BY CLOCK FREQUENCY SCALING AND ADAPTIVE INTERLEAVING OF POLLING

(71) Applicant: Qualcomm Incorporated, San Diego, CA (US)

(72) Inventors: Sandeep Kumar, Navi Mumbai (IN); Suman Kumar, Bangalore (IN); Deven Balani, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/558,200

(22) Filed: Dec. 21, 2021

(65) Prior Publication Data

US 2022/0113782 A1     Apr. 14, 2022

Related U.S. Application Data

(62) Division of application No. 16/222,381, filed on Dec. 17, 2018, now Pat. No. 11,249,536.

(51) Int. Cl.
  *G06F 1/324*      (2019.01)
  *G06F 1/3234*    (2019.01)
  (Continued)

(52) U.S. Cl.
  CPC ............ *G06F 1/324* (2013.01); *G06F 1/3275* (2013.01); *G06F 13/16* (2013.01);
  (Continued)

(58) Field of Classification Search
  CPC ...................................................... G06F 21/73
  See application file for complete search history.

(56) References Cited

U.S. PATENT DOCUMENTS 4,638,428 A      1/1987  Gemma et al.
5,684,802 A  *  11/1997  Perreault ............... H04L 12/403
                                                                370/449
(Continued)

OTHER PUBLICATIONS

Author Unknonwn, "MX35UFxG14AC: 1.8V, 1G/2G-bit Serial NAND Flash Memory," Macranix International Co., Ltd., Rev. 0.04, Sep. 14, 2017, 44 pages.
(Continued)

*Primary Examiner* — Henry Tsai
*Assistant Examiner* — Juanito C Borromeo
(74) *Attorney, Agent, or Firm* — QUALCOMM Incorporated

(57) ABSTRACT

Reducing power consumption of communication interfaces by clock frequency scaling and adaptive interleaving of polling is disclosed. In a first aspect, a control system controls transmission of a command via a serial interface at a higher clock frequency. After transmission, the control system and the interface are operated at a lower clock frequency to save power during command execution. In this aspect, a reduction in polling corresponds to the reduction in clock signal frequency. When the command is complete, the interface is operated at the higher frequency to send another command. In a second aspect, after the control system sends a command to the receiving device, polling is suspended and an execution time of the command is tracked. Polling begins when the tracked execution time almost equals an expected completion time. Both aspects disclosed above may be implemented to reduce power consumption in exchange for a small increase in latency.

18 Claims, 9 Drawing Sheets

(51) Int. Cl.
    *G06F 13/16*      (2006.01)
    *G06F 13/42*      (2006.01)
    *G06F 13/372*      (2006.01)

(52) U.S. Cl.
    CPC ........ *G06F 13/1668* (2013.01); *G06F 13/372* (2013.01); *G06F 13/4291* (2013.01)

(56) References Cited

U.S. PATENT DOCUMENTS

| | | |
|---|---|---|
| 8,904,082 B1 | 12/2014 | Brahmadathan et al. |
| 9,627,031 B1 | 4/2017 | Chen et al. |
| 2004/0123169 A1 | 6/2004 | Elnozahy et al. |
| 2012/0210157 A1 | 8/2012 | Wang |
| 2012/0272088 A1 | 10/2012 | Lee |
| 2013/0212408 A1 | 8/2013 | Fernald |
| 2014/0304436 A1 | 10/2014 | Mortensen et al. |
| 2014/0344597 A1 | 11/2014 | Thumma |
| 2016/0293264 A1 | 10/2016 | Al-Shamma et al. |
| 2016/0335205 A1 | 11/2016 | Winbom et al. |
| 2018/0018118 A1 | 1/2018 | Raghava et al. |
| 2020/0042443 A1* | 2/2020 | Keung .................. G06F 3/0659 |
| 2020/0192455 A1 | 6/2020 | Kumar et al. |

OTHER PUBLICATIONS

International Search Report and Written Opinion—PCT/US2019/066674—ISAEPO—dated May 7, 2020.
Partial International Search Report—PCT/US2019/066674—ISA/EPO—dated Mar. 12, 2020.

\* cited by examiner

REDUCING POWER CONSUMPTION OF COMMUNICATION INTERFACES BY CLOCK FREQUENCY SCALING AND ADAPTIVE INTERLEAVING OF POLLING

CLAIM OF PRIORITY UNDER 35 U.S.C. § 119

The present Application for Patent claims priority to Non-provisional application Ser. No. 16/222,381 entitled, "REDUCING POWER CONSUMPTION OF COMMUNICATION INTERFACES BY CLOCK FREQUENCY SCALING AND ADAPTIVE INTERLEAVING OF POLLING" filed Dec. 17, 2018, assigned to the assignee hereof and hereby expressly incorporated by reference herein

BACKGROUND

I. Field of the Disclosure

The technology of the disclosure relates generally to communication between electronic devices, and in particular to reducing power consumption in interfaces controlling communication between electronic devices.

The technology of the disclosure relates generally to communication between electronic devices, and in particular to reducing power consumption in interfaces controlling communication between electronic devices.

II. Background

Computing devices take many forms depending on their intended purpose. Regardless of the configuration of a computing device, the components thereof must communicate with each other, which typically includes transferring information in the form of signals over wireless or wire-based communication links. The physical design of a wire-based communication link depends on several factors, including packaging limitations, cost objectives, distance between components, and bandwidth requirements. To transfer a large amount of data in a short period of time, a wire-based communication link may include several wires that transfer multiple bits of binary data simultaneously in parallel. However, due to package limitations, for example, a wire-based communication link may be a serial interface limited to one wire over which bits of binary data are sent serially (i.e., sequentially). A signal representing each bit of binary data is maintained on the wire for a period according to a periodic clock signal. Thus, the frequency of the periodic clock signal determines a rate of data transmission on the interface.

The binary information transferred between components may be commands, including address information, data, and/or control information. A command to a receiving device coupled to the communication link may be a request for information or a request for the receiving device to take action. When the command is a request for information, the sender is informed of completion of the request when the sender receives a response. Reception of the response may also indicate that the receiving device is ready for another command. When the command is a request for action, the sender may receive an acknowledgement from the receiving device when the action is complete or when the receiving device is ready for a next command. Some components, however, are not designed to provide automatic confirmation that a request has been completed. In this case, a sender may initiate further communication, such as a request for information confirming completion of the request. A process of periodically repeating such requests for information until a confirmation is received is known as polling.

To increase the rate of transmission (i.e., bandwidth) a control system and interface associated with the communication link may operate at a high frequency. Operation at high frequencies may require a high frequency clock. Repeated polling at a high frequency (set by the high frequency clock) reduces latency. Latency is an amount of time between a receiving device becoming ready for a next command, and a sender being informed that the receiving device is ready. Minimizing latency increases interface efficiency. However, the control system that generates the signals on the wire-based communications link includes transistors that may consume power each time the transistors are triggered by the clock signal (i.e., every clock period). In addition, power is consumed in the interface when signals are generated on the wire-based communication link for repeated polling in the polling period (e.g., during the command execution). Thus, a level of power consumption of the control system depends directly on the frequency of the clock signal and on a total number of polling events in the polling period. The power consumed by polling reduces the operating time of battery-powered devices and may cause unwanted heating. Accordingly, there is a need to reduce power consumption in the control system and interface while maintaining a high transmission rate and minimal polling latency.

SUMMARY OF THE DISCLOSURE

Aspects disclosed in the detailed description include a system and method for reducing power consumption of communication interfaces by clock frequency scaling and adaptive interleaving of polling. In particular, power consumption in a communication interface may be reduced by scaling down a frequency of a periodic clock signal to the interface and the interface control system while a command sent to a receiving device is executed by the receiving device. Power consumption may be further reduced by adaptively interleaving polling for most of an expected execution time of the command. In a first aspect, the control system controls transmission of a command via the interface at a higher clock frequency. After the transmission of the command, the control system and the interface are operated at a lower clock frequency to save power during command execution. In this aspect, polling is reduced in response to the reduction in clock signal frequency. When the command is complete, the interface is operated at the higher frequency to send another command. In a second aspect, after the control system sends a command to the receiving device, polling is suspended and an execution time of the command is tracked. Polling begins when the tracked execution time almost equals an expected time of completion. Both aspects disclosed above may be implemented to reduce power consumption in exchange for a small increase in latency.

In this regard, in one aspect, a method of scaling a frequency of an interface is disclosed. The method includes sending a command, via a serial interface operating at a first clock frequency, to a device for execution by the device, operating the serial interface at a second clock frequency in response to sending the command, and operating the serial interface at the first clock frequency in response to determining the device is ready for another command.

In another aspect, an interface controller is disclosed. The interface controller includes a serial interface configured to couple to a wire-based communication link, and a control system coupled to the serial interface. The control system is configured to operate the serial interface at a first clock frequency to send a command via the wire-based communication link, to a device for execution by the device, operate the serial interface at a second clock frequency in response to the command being sent, and operate the serial interface at the first clock frequency in response to determining that the device is ready for another command.

In another aspect, a method of interleaved polling on an interface is disclosed. The method includes sending a command via an interface to a device for execution by the device, incrementing a counter value to track an execution time, comparing the counter value to an operation value determined from a previous command execution time, and based on the comparison, polling the device for a status.

In another aspect, an apparatus including an interface controller is disclosed. The apparatus includes an interface configured to couple to a wire-based communication link, and a control system coupled to the interface. The control system is configured to send a command via the interface to a device for execution by the device, increment a counter value to track an execution time, compare the counter value to an operation value that is based on a previous execution time of the command and, based on the comparison, poll the device for a status indicating completion of the command.

In another aspect, a method of reducing power demands of an interface is disclosed. The method includes sending a command, via an interface operating at a first clock frequency, to a device for execution, operating the interface at a second clock frequency in response to sending the command, incrementing a counter value to track an execution time, comparing the counter value to an operation value determined from a previous command execution time, based on the comparison, polling the device for a status, and operating the interface at the first clock frequency in response to the status indicating the device is ready for a another command.

In another aspect, an interface controller is disclosed. The interface controller includes an interface configured to couple to a wire-based communication link, and a control system coupled to the interface. The control system is configured to send a command, via the interface operating at a first clock frequency, to a device for execution, operate the interface at a second clock frequency in response to sending the command, increment a counter value to track an execution time of the command, compare the counter value to an operation value determined from a previous execution time of the command, based on the comparison, poll the device for a status, and operate the interface at the first clock frequency in response to the status indicating the device is ready for another command.

In another aspect, a method of reducing power demands created by a bus is disclosed. The method includes, while operating a bus at a first clock frequency, sending a command from a first device associated with the bus to a second device, after sending the command, operating the bus at a second clock frequency, and after receiving an indication that the second device has completed the command, operating the bus at the first clock frequency again.

In another aspect, a method of reducing traffic on a bus is disclosed. The method includes sending a command from a first device associated with a bus to a second device associated with the bus over the bus, predicting an amount of time for the second device to complete the command, and proximate an expiration of the amount of time, beginning to poll the second device for a status of completion of the command.

DETAILED DESCRIPTION

Figure 1:
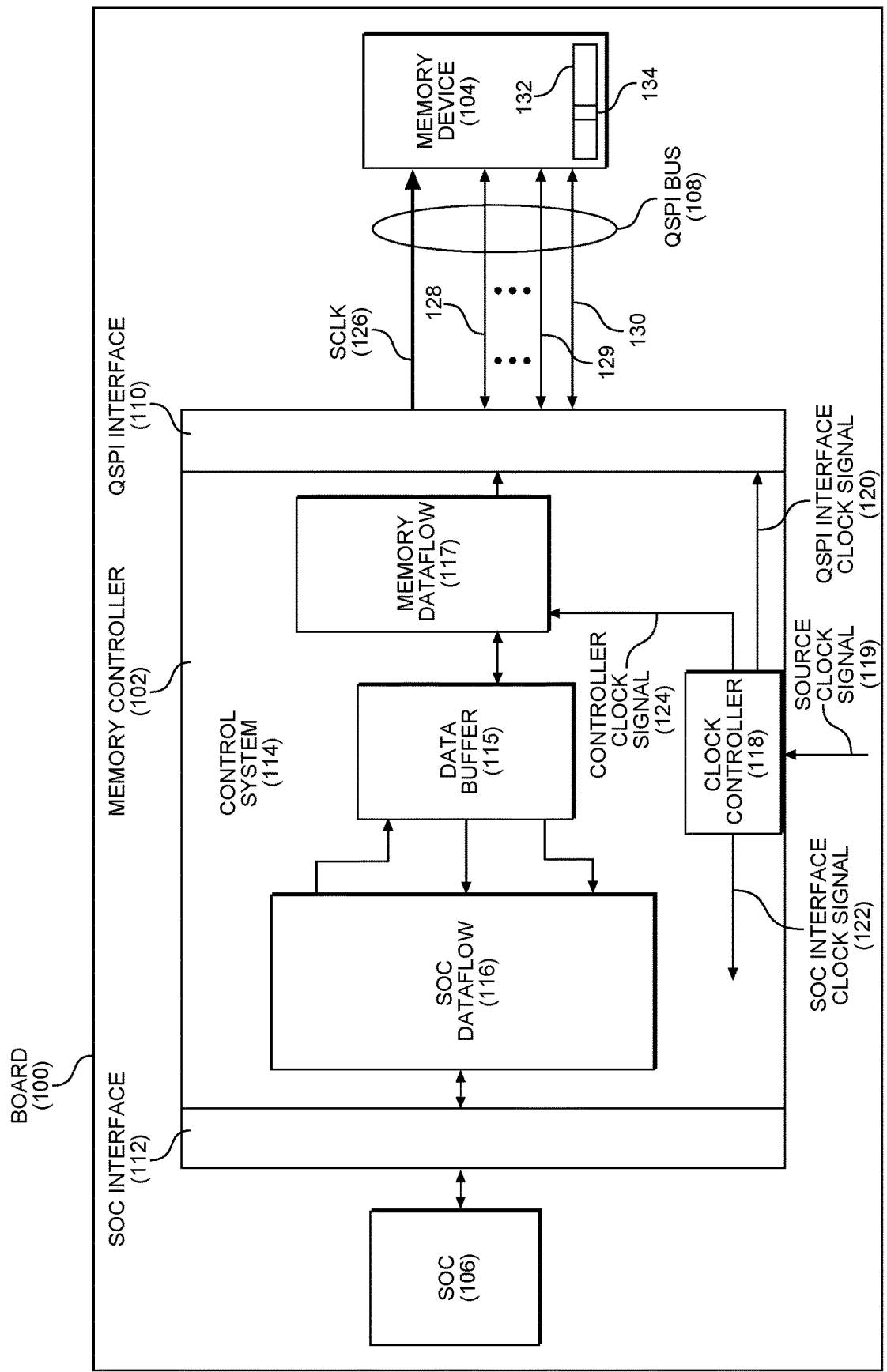
FIG. 1 is a block diagram of an exemplary serial peripheral interface (SPI) controller coupled to a serial NAND memory device.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include a system and method for reducing power consumption of communication interfaces by clock frequency scaling and adaptive interleaving of polling. In particular, power consumption in a communication interface may be reduced by scaling down a frequency of a periodic clock signal to the interface and the interface control system while a command sent to a receiving device is executed by the receiving device. Power consumption may be further reduced by adaptively interleaving polling for most of an expected execution time of the command. In a first aspect, the control system controls transmission of a command via the interface at a higher clock frequency. After the transmission of the command, the control system and the interface are operated at a lower clock frequency to save power during command execution. In this aspect, polling is reduced in response to the reduction in clock signal frequency. When the command is complete, the interface is operated at the higher frequency to send another command. In a second aspect, after the control system sends a command to the receiving device, polling is suspended and an execution time of the command is tracked. Polling begins when the tracked execution time almost equals an expected time of completion. Both aspects disclosed above may be implemented to reduce power consumption in exchange for a small increase in latency.

A power reducing system and method as disclosed herein reduces power consumption in a computing device by reducing power consumption in a communication interface between components of the computing device. The computing device includes a processing system that processes commands stored in a memory, and a memory controller that controls transfer of data between the processing system and the memory device. Incidentally, the processing system may be a system-on-chip (SOC), which may be a network on a chip (NOC). As disclosed herein, power consumed by the memory controller in the interface to the memory device may be reduced. An example of a system and method including the inventive aspects disclosed herein is illustrated in FIGS. 5-10, as discussed further below.

Figure 2:
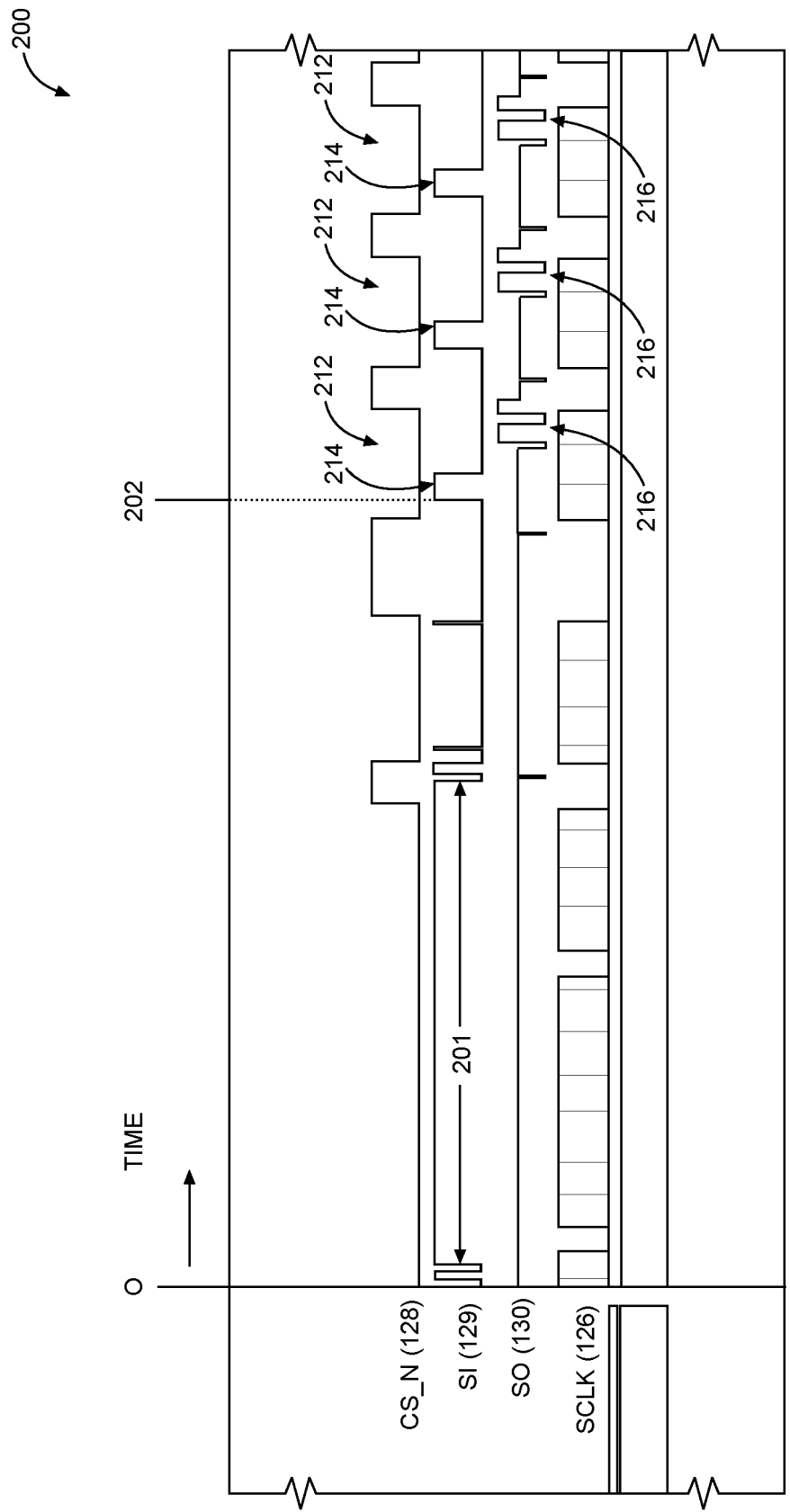
FIG. 2 is a timing diagram illustrating signal levels on an exemplary wire-based communication link over which a command is sent to a serial NAND memory device and polling is initiated.
Figure 3:
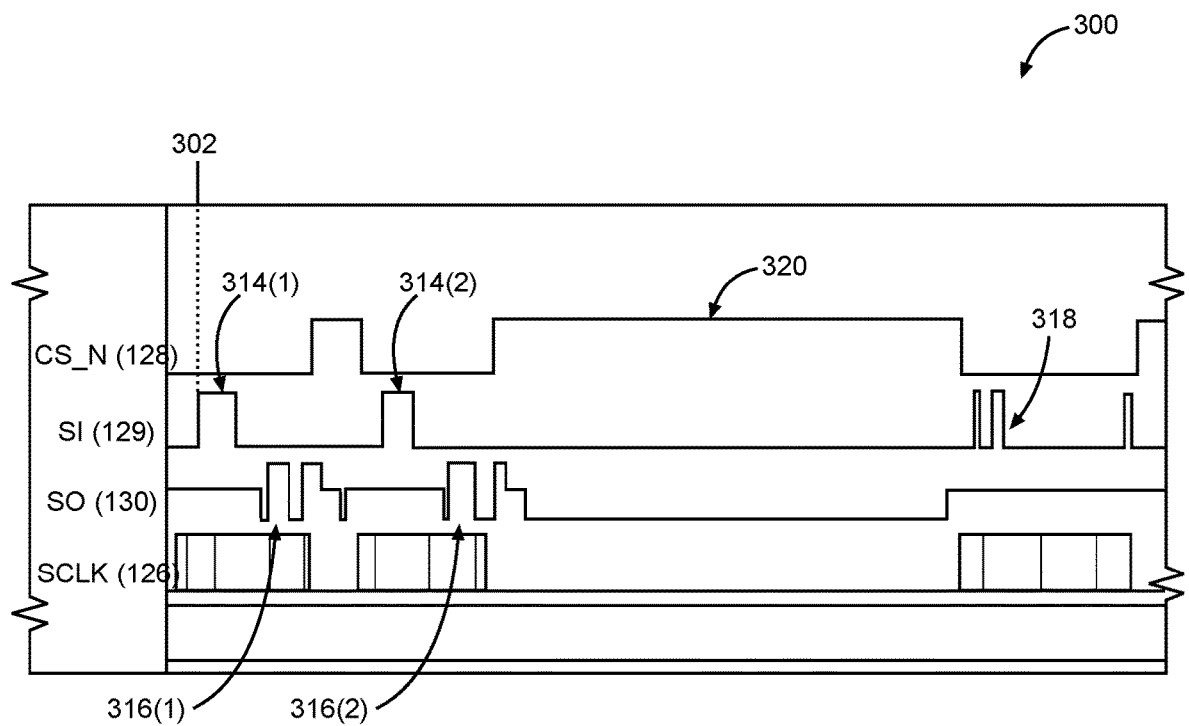
FIG. 3 is a timing diagram illustrating signal levels on an exemplary wire-based communication link at the end of a period of polling a serial NAND memory device.
Figure 4:
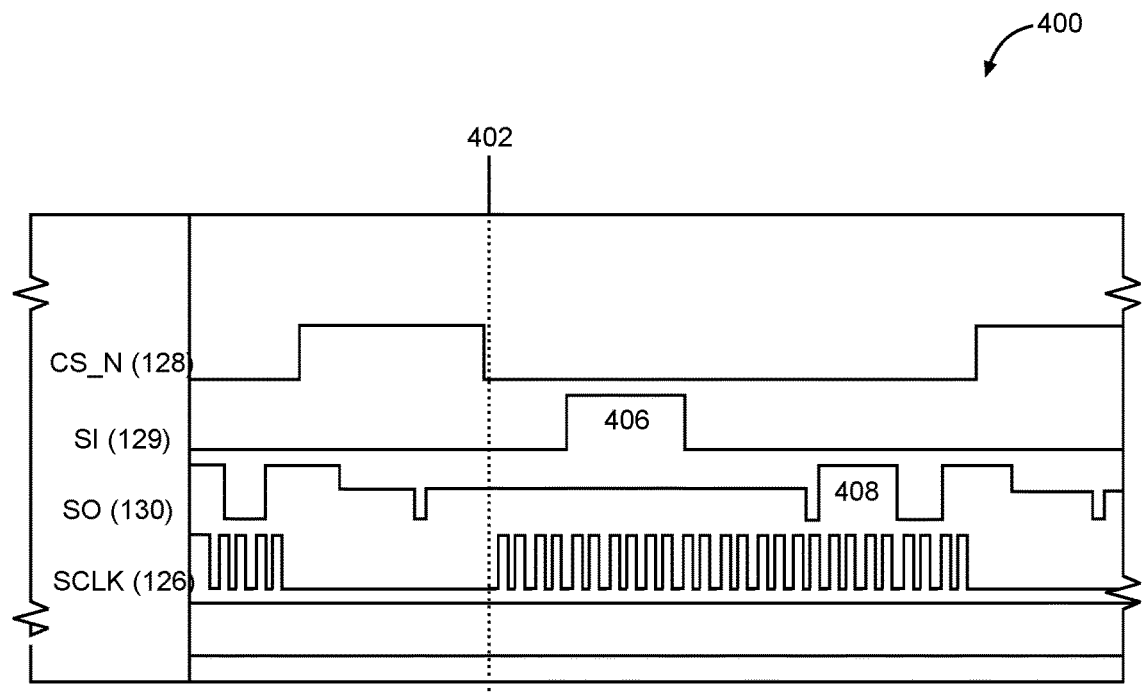
FIG. 4 is a timing diagram illustrating signal levels on an exemplary wire-based communication link during a polling event.

First, however, for an improved understanding of the inventive aspects, a discussion of an exemplary computing device including a memory controller coupled between a memory device and a SOC, as illustrated in FIG. 1, is provided. Specifically, FIG. 1 illustrates an exemplary serial Not AND (NAND) Flash memory controller coupled to a serial NAND Flash memory device via a serial peripheral interface (SPI) bus or a Quad SPI (QSPI) bus. SPI and QSPI are well-known serial interfaces for short distance communication between a master device, which issues commands, and a slave device, which receives and executes the commands. Details of operation of the serial interface between the memory controller and the memory device of FIG. 1, and power consumed by such interface, are discussed with reference to the timing diagrams in FIGS. 2-4. The timing diagrams in FIGS. 2-4 illustrate transitions of signal levels of the exemplary SPI/QSPI bus during a command sequence.

In this regard, FIG. 1 illustrates an exemplary board 100 on which a memory controller 102 is coupled between a memory device 104 and a SOC 106. The memory device 104 stores data accessible for use in the SOC 106, and the memory controller 102 controls bidirectional transfer of data between the SOC 106 and the memory device 104. The memory device 104 may store commands ("boot code") for booting up the SOC 106 when power is turned on or in response to a system reset. The memory device 104 is a serial NAND Flash memory device that is controlled by commands received from the memory controller 102 over a QSPI bus 108. The memory controller 102 includes a QSPI interface 110 to control the QSPI bus 108. The memory controller 102 also includes a SOC interface 112 to control communication with the SOC 106, and a control system 114 to manage data flow between the SOC interface 112 and the QSPI interface 110.

The control system 114 includes a data buffer 115 in which data being transferred between the SOC interface 112 and the QSPI interface 110 may be temporarily stored because the SOC interface 112 and the QSPI interface 110 do not operate synchronously with each other. The data buffer 115, together with a SOC dataflow 116 and a QSPI dataflow 117, transfers data between the SOC interface 112 and the QSPI interface 110.

Each of the QSPI interface 110, the SOC interface 112, and the control system 114 include sequential logic circuits (not shown) that operate according to periodic clock signals. In this regard, the QSPI interface 110, the SOC interface 112, and the control system 114 may operate at frequencies different from each other. The control system 114 includes a clock controller 118 that receives an external source clock signal 119. The clock controller 118 divides the source clock signal 119 and distributes clock signals to the QSPI interface 110, the SOC interface 112, and the control system 114. The QSPI interface 110 may receive a QSPI interface clock signal 120 having the same or a lower frequency than the source clock signal 119. The SOC interface 112 receives a SOC interface clock signal 122 having a frequency lower than or equal to the source clock signal 119, and the control system 114 receives a controller clock signal 124 that has a frequency the same or lower than the frequency of the SOC interface clock signal 122. The QSPI interface 110 corresponds to a QSPI standard known in the art. QSPI uses a set of signals that are transmitted over conductors on the QSPI bus 108. The set of QSPI signals includes a serial clock (SCLK) signal 126, a chip_select (low active) (CS_N) signal 128, a master out Slave In (SI) signal 129, and a master in Slave Out (SO) signal 130. In a QSPI, the SCLK signal 126 synchronizes the QSPI master and slave, the CS_N signal 128 is sent by the master to enable communication with the slave, the SI signal 129 is a serial data transfer signal from the master to the slave, and the SO signal 130 is a serial data transfer signal from the slave to the master.

Each signal in the QSPI bus 108 is provided as an electrical signal on a separate conductor (e.g., wire). In this regard, the SCLK signal 126 is provided to the memory device 104 at a frequency based on the QSPI interface clock signal 120 or based on the controller clock signal 124. The C_SN signal 128, the SI signal 129, and the SO signal 130 are each provided on separate wires.

The memory device 104 includes a status register 132 including a ready bit 134 that indicates whether the memory device 104 is ready to receive a command. In the board 100 in FIG. 1, the QSPI interface 110 in the memory controller 102 is the "master" of the QSPI bus 108 and the memory device 104 is a "slave" device. Communication between the memory controller 102 and the memory device 104 via the QSPI interface 110 is illustrated in the timing diagrams of FIGS. 2-4.

FIG. 2 is a timing diagram 200 showing signals on the QSPI bus 108 between the QSPI interface 110 and the memory device 104. In FIG. 2, a command 201 is transmitted over the QSPI bus 108. The CS_N signal 128 is active (low) to enable communication while the command 201 in the form of binary information is sent on the SI signal 129 from the QSPI interface 110 to the memory device 104 (prior to time 202). While the command 201 is sent on the SI signal 129, the SO signal 130 is inactive. Starting at time 202, the command 201 is complete and the QSPI interface 110 begins polling events to the memory device 104 via the QSPI interface 110. To poll the memory device 104, the CS_N signal 128 is held active (valleys 212) and the SI signal 129 is used to send a polling event 214 (e.g., a polling command requesting a value of the status register 132) to the memory device 104. In the timing diagram 200, a polling event 214 begins at the rising edge of the SI signal 129. In response to each polling event 214, the memory device 104 sends binary information 216 including a value of the status register 132 to the QSPI interface 110 on the SO signal 130. Until the memory device 104 completes execution of the command 201, the ready bit 134 remains unasserted. Thus, in response to the polling events 214 shown in FIG. 2, the returned status information indicates that the memory device 104 is still busy executing the command 201.

FIG. 3 is a timing diagram 300 showing signals of the QSPI bus 108 at the end of a polling sequence. At 302 in FIG. 3, a polling event 314(1) is initiated, and the memory device 104 returns a value of the ready bit 134 indicating that a command is not complete. Specifically, the SI signal 129 indicates polling event 314(1) sent from the QSPI interface 110 to the memory device 104, and the SO signal 130 indicates binary information 316(1) sent from the memory device 104 to the QSPI interface 110 in response. When the memory device 104 completes execution of a first command, the ready bit 134 is asserted to indicate that the memory device 104 is ready to receive another command. In response to a polling event 314(2), the memory device 104 returns binary information 316(2) in which a value of the ready bit 134 is asserted. The polling event 314(2) and the corresponding binary information 316(2) are provided over the SI signal 129 and the SO signal 130, respectively. Based on the binary information 316(2), the control system 114 is informed that the memory device 104 is ready for another command, and as the control system 114 prepares to send a new command 318, the CS_N signal 128 remains inactive 320. The new command 318 begins with activation of the CS_N signal 128 and the SI signal 129.

FIG. 4 is a timing diagram 400 showing detailed signals of the QSPI bus 108 during a polling event 406. After the CS_N signal 128 is asserted at time 402, the QSPI interface 110 sends the polling event 406 on the SI signal 129, requesting a value of the status register 132, and the memory device 104 sends a response 408 over the SO signal 130 with the value of the status register 132. As the value of the status register 132 is evaluated in the control system 114, the C_SN signal 128 is held inactive to disable communication with the memory device 104. In the timing diagram 400, changes in the QSPI bus 108 signals correspond to transitions of voltage levels on wires of the QSPI bus 108. The voltage transitions in FIG. 4 occurring in response to the polling event 406 also occur in every polling event 214 shown in FIG. 2. Polling events may be repeated back to back during a polling period. A polling period begins after a command is transmitted to the memory device 104 and ends when the memory device 104 completes execution of the command. In one example of a commercially available memory device 104 (e.g., Macronix NAND Flash MX35UF1G14AB), a time for completion of commands (e.g., read, write, erase and reset) corresponds to a period of repeated polling that varies from a few microseconds (μs) to a few milliseconds (ms).

As noted above, power may be consumed each time a sequential circuit including transistors, such as the control system 114 and the QSPI interface 110, is triggered by a clock signal. In addition, power is consumed in the QSPI interface 100 during transitions of voltage levels supplied on the wires of the QSPI bus 108. Thus, a significant amount of power is consumed in the control system 114 and the QSPI interface 110 in a polling period due to clocking and voltage transitions. The power consumed by the QSPI interface 110 during polling reduces operation time in battery-powered devices, and causes unwanted heating.

In this regard, there is a need to reduce an amount of power consumed in an interface by issuing polling events while waiting for a device to execute a command. Since the amount of power consumed is based on power consumed in circuits when triggered by a periodic clock signal, reducing the number of times an interface circuit is triggered during each polling operation would reduce power consumption during a polling period. In addition, reducing the number of polling events that occur during a polling period would reduce power consumption during a polling period. However, there is a need to avoid significantly increasing latency in the QSPI interface. The system and method disclosed herein reduce power consumption during a polling period while maintaining a high transmission rate and minimal polling latency.

Figure 5:
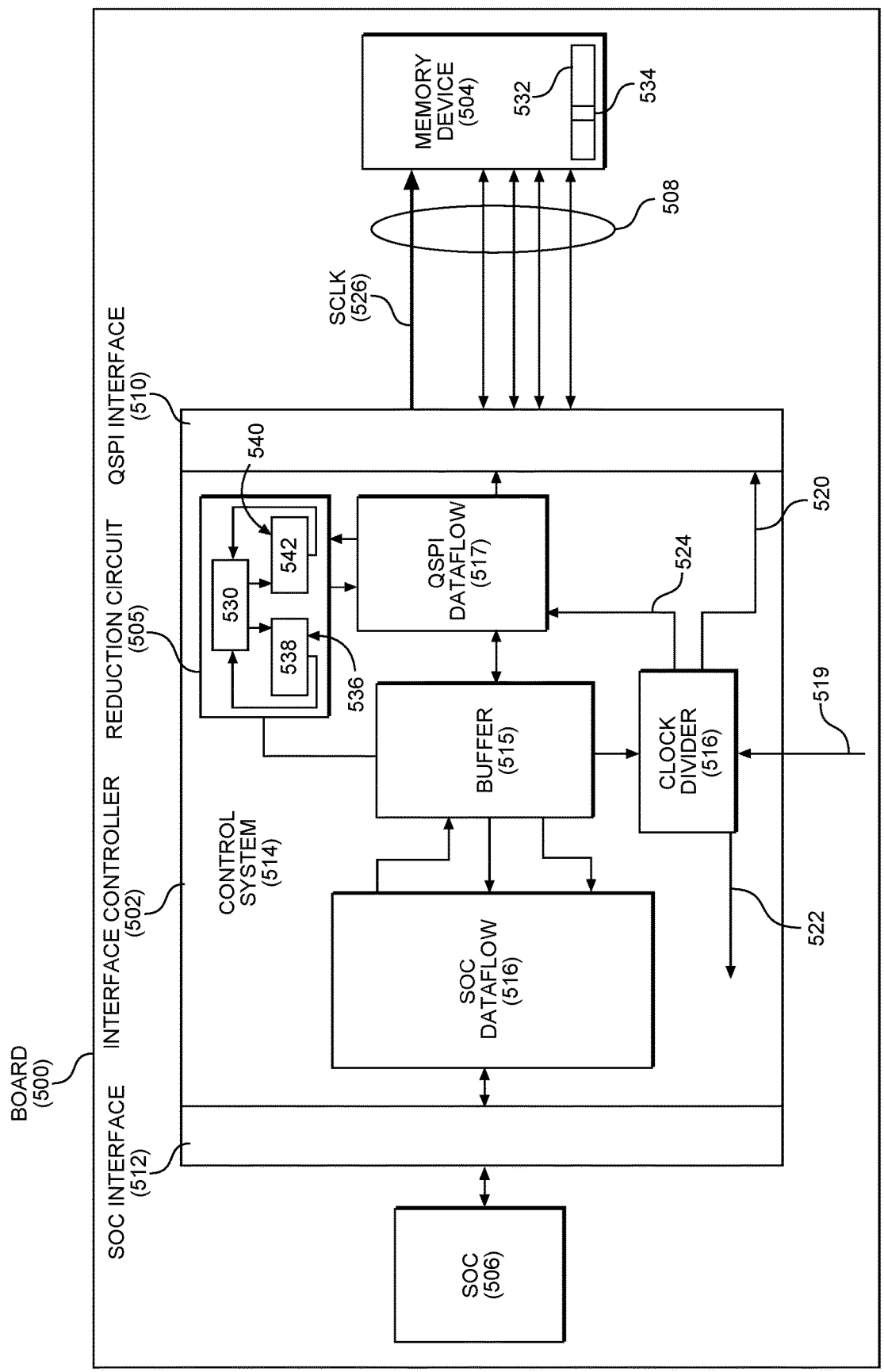
FIG. 5 is a block diagram of an exemplary interface controller coupled to a memory device, including an interface and a control system for implementing scaling clock frequency and adaptively interleaving polling via the interface.

FIG. 5 illustrates an exemplary board 500 on which an interface controller 502 is coupled to a memory device 504, which could be the memory device 104 of FIG. 1. The interface controller 502 is also coupled to a SOC 506, which could be the SOC 106 in FIG. 1. The memory device 504 and the SOC 506 operate as described with regard to FIG. 1, and the interface controller 502 controls bidirectional data flow between the SOC 506 and the memory device 504. The interface controller 502 includes a SOC interface 512, a control system 514, and a QSPI interface 510. In another example, the interface controller 502 may be internal to the SOC 506, such that the SOC interface 512 is an internal interface, and the QSPI interface 510 may be an interface of the SOC 506 coupled to an external memory device 504. The power reducing methods disclosed herein are not limited to interfaces to memory devices or to a QSPI interface. The disclosed power reducing methods may be applicable to any parallel or serial interface in which clocked circuits in a sending device operate an interface that polls a receiving device for a status after sending a command. The SOC interface 512 is configured to couple to the SOC 506. The QSPI interface 510 is configured to couple to a QSPI bus 508, which could be the QSPI bus 108 of FIG. 1. The QSPI bus 508 is a wire-based communication link further coupled to the memory device 504. The control system 514 is coupled to the QSPI interface 510 and to the SOC interface 512, and manages the bidirectional transfer of data. The control system 514 employs the QSPI interface 510 to send commands to the memory device 504 via the QSPI bus 508. The control system 514 also employs the QSPI interface 510 to poll a status register 532 of the memory device 504 in a polling period during execution of the command by the memory device 504 to determine when the memory device 504 is ready for another command. The control system 514 includes a data buffer 515 in which data being transferred between the SOC interface 512 and the QSPI interface 510 may be temporarily stored because the SOC interface 512 and the QSPI interface 510 do not operate synchronously with each other. The data buffer 515, together with a SOC dataflow 516 and a QSPI dataflow 517, transfers data between the SOC interface 512 and the QSPI interface 510.

The control system 514 differs from the control system 114 in FIG. 1 in that the control system 514 includes a power reduction circuit ("reduction circuit") 505 and a clock divider 518. The control system 514, including the reduction circuit 505 and the clock divider 518 may be implemented in circuits, such as integrated circuits (ICs) including transistors. The reduction circuit 505 is configured to reduce, in two aspects, power consumed in the QSPI interface 510 and the interface controller 502 in a polling period after a command is sent to the memory device 504, and before a status of the memory device 504 indicating completion of the command is received in the interface controller 502. In a first aspect, the reduction circuit 505 may reduce power consumption in the QSPI interface 510 by scaling down (i.e., temporarily reducing) frequencies at which the QSPI interface 510 and the control system 514 operate after a command is sent to the memory device 504. In a second aspect, the reduction circuit 505 also reduces power consumption by adaptively suspending polling for an amount of time almost equal to an expected execution time of the command.

Regarding the first aspect of operation of the reduction circuit 505, the clock divider 518 may be configured to divide a source clock 519 to generate and distribute clocks to the QSPI interface 510, the SOC interface 512, and the control system 514. The QSPI interface 510 receives a QSPI interface clock signal 520, the SOC interface 512 receives a SOC interface clock signal 522, and the control system 514 receives a controller clock signal 524. The reduction circuit 505 controls frequencies of the QSPI interface clock signal 520 and the controller clock signal 524 generated by the clock divider 518. The control system 514 operates at a frequency of the controller clock signal 524, and the QSPI interface 510 operates at a frequency of the QSPI interface clock signal 520. The QSPI interface 510 may provide a QSPI bus clock (SCLK) signal 526 to the memory device 504 based on the frequency of the QSPI interface clock signal 520. Thus, the frequency of operation of the control system 514, the QSPI interface 510, and the SCLK signal 526 may all be controlled by the reduction circuit 505.

In this regard, the control system 514 is configured to operate the QSPI interface 510 at a first clock frequency to send a command via the QSPI bus 508 to the memory device 504 for execution of the command by the memory device 504. The control system 514 is configured to, in response to the command being sent, operate the QSPI interface 510 at a second clock frequency. During a polling period in which the command is being executed by the memory device 504, the QSPI interface 510 operates at the second clock frequency. A frequency of polling events changes according to the change in frequency of the QSPI interface clock signal 520 from the first clock frequency to the second clock frequency. To reduce power consumption during the polling period, the second clock frequency is lower than the higher first clock frequency. Thus, the frequency of polling events during a polling period is reduced, so the total number of polling events, which consume power, is reduced.

For example, sending a command via the QSPI interface 510 includes sending a command and associated binary data (e.g., for addressing and control) while the QSPI interface clock signal 520 is at a first clock frequency. A higher first clock frequency provides a higher rate of transmission of the command and associated binary data. A lower second clock frequency of the QSPI interface clock signal 520 in a polling period may be set to less than or equal to $3/20$, for example, or $1/10$ of the first clock frequency. However, any second clock frequency that is lower than the first clock frequency will reduce power consumption during the polling period. As a result of a clock frequency reduction, a frequency of polling of the memory device 504 may be correspondingly reduced to $3/20$ or $1/10$ of the frequency of polling at the first clock frequency. A frequency of the SCLK signal 526 provided to the memory device 504 may also be changed to the second clock frequency to correspond to the frequency of operation of the QSPI interface 510. Power consumption is reduced by operating the QSPI interface 510 at the second clock frequency during the polling period, rather than continuing to operate at the first clock frequency.

Polling involves repeated polling events in which a request for a value of the status register 532 is sent to the memory device 504 and the memory device 504 returns a current value of the status register 532. Before execution of the command is complete, the value of the status register 532 returned in response to each polling event indicates that the memory device 504 is not ready for another command. Eventually, the memory device 504 completes execution of the command and returns a value of the status register 532 indicating that the memory device 504 is ready for another command. The control system 514 is configured to operate the QSPI interface 510 at the first clock frequency in response to determining the device is ready for another command.

A time interval of each polling event depends on a time required for serial transmission of bits of binary information via the QSPI bus 508, a time waiting for the memory device 504 to begin responding, and a time to receive bits of binary information from the memory device 104 including the value of the status register 532. In a worst case scenario, from an efficiency perspective, the memory device 504 may complete execution of a command and be ready for another command immediately after sending a value of the status register 532 to the QSPI interface 510 indicating that the memory device 504 is not ready for another command. Thus, the interface controller 502 must wait until the next polling event to determine that the memory device 504 is ready. As noted above, a longer latency decreases the efficiency of an interface because during a latency time, the interface controller 502 could begin sending another command to the memory device 504, but is not yet informed that the memory device 504 is ready for another command.

One effect of reducing the frequency of the QSPI interface clock signal 520 and the SCLK signal 526 during a polling period is that the time interval of each polling event is longer, which increases latency and reduces interface efficiency. However, relative to a total time of a polling period, an increase in latency due to a reduction in frequency is an acceptable trade-off for the savings in power consumption achieved due to the reduction in frequency during the polling period.

As noted above, in response to the interface controller 502 determining that the memory device 504 is ready for another command, the reduction circuit 505 controls the clock divider 518 to generate the controller clock signal 524 and the QSPI interface clock signal 520 at the first clock frequency to provide the higher rate of transmission for the next command. The memory device 504 may be a NAND FLASH memory device or a Not OR (NOR) FLASH memory device, for example, but the aspects disclosed herein are applicable to any comparable slave device. Commands sent to the memory device 504 may include, for example, a read command, a write command, an erase command, or a reset command.

Regarding the second aspect of operation of the reduction circuit 505, the reduction circuit 505 reduces power consumption by adaptively interleaving polling, which includes suspending polling for most of an expected execution time of a command to reduce a number of unnecessary polling events. Ideally, polling would be suspended until the exact moment the memory device 504 completes execution of the command and sets the ready bit 534 in the status register 532. In such case, no polling events would result in an indication that the memory device 504 is not ready for another command. Thus, the only polling event would result in an indication that the memory device 504 is ready for another command, so no power would be consumed unnecessarily on polling. To avoid wasting any time after the memory device 504 is ready (e.g., to avoid latency), the polling event must occur at the exact moment a ready bit 534 in the status register 532 is set to indicate that the memory device 504 is ready for another command. However, due to variations among devices, such as the memory device 504, and changes in behavior in such devices over time, it is generally not possible to predict the exact moment the memory device 504 will complete execution of a command.

In this regard, the reduction circuit 505 allows the control system 514 to save power during a polling period by tracking a time of execution of a command by the memory device 504, and adaptively suspending polling during most of the polling period, based on the tracked time. For example, if a time of execution of a command varies by 5% more or less than a known amount of time, such that all command executions take at least 95% of the known amount of time, then suspending polling for 95% of the known amount of time would significantly reduce unnecessary power consumption, and polling would begin before completion of the command, thereby avoiding latency.

As shown in FIG. 5, the reduction circuit 505 includes a reduction circuit control 530 to control operation of the reduction circuit 505. The reduction circuit 505 tracks the amount of time of execution of the command with a counter value 536 in a counter register 538 included in the reduction circuit 505. In response to sending a command to the memory device 504, the reduction circuit control 530 initializes the counter value 536 in the counter register 538 (e.g., to "0") and increments the counter value 536 to track a command execution time. For example, the counter value 536 may be incremented (e.g., adding one (1) to the counter value 536) every clock cycle. In another example, the counter value 536 may be incremented every polling cycle, which may be several clock cycles. By incrementing the counter value 536 according to the polling cycle instead of every clock cycle, a size of the counter register 538 may be reduced. The reduction circuit 505 maintains an operation value 540 in an operation value register 542. The operation value 540 is set based on a previous execution time of a command. The operation value 540 as used herein is a value based on execution time of one or more previous commands, where an execution time is a time from sending a command via an interface (e.g., the QSPI interface 510) until an indication that execution of the command is complete is received. The reduction circuit control 530 is configured to compare the counter value 536 to the operation value 540, and the control system 514 polls the memory device 504 for the value of the status register 532 based on a result of the comparison. Specifically, the control system 514 suspends polling (i.e., does not begin polling the memory device 504) until the counter value 536 is equal to or greater than the operation value 540. The reduction circuit 505 is configured to set a new operation value 540 in the operation value register 542 based on the counter value 536 after completion of a command. Setting new operation values 540 allows the interface controller 502 to adjust to changes in an amount of time to complete execution of a command in the memory device 504.

For example, immediately after the board 500 is reset, a first command of a first type may be sent to the memory device 504. Upon sending the command, the reduction circuit 505 initializes (e.g., sets to zero) the counter value 536 and the operation value 540. The counter value 536 may be incremented every clock cycle (or polling cycle) and compared to the operation value 540. In this case, the counter value 536 is equal to or greater than the operation value 540 because both are initialized to zero. Since the counter value 536 is greater than or equal to the operation value 540, the interface controller 502 begins polling. The value of the counter value 536 continues to be incremented every clock cycle until incrementing is stopped at the moment when the interface counter 502 is informed that the memory device 504 is ready for another command, which is based on the ready bit 534 in the value of the status register 532 received in response to a polling command. The counter value 536 at such moment indicates a time of execution of the first command and may be used as an expected amount of time for execution of a second command of the first type or a command of another type. In this regard, the operation value 540 may be set to the expected amount of time for executing a command (the counter value 536) based on the time of execution of the first command.

In one example, the operation value 540 may be set to 100% of the counter value 536 indicating the time of execution of the first command. The counter value 536 is initialized when a second command is sent to the memory device 504, and the counter value 536 is incremented every clock cycle. The counter value 536 is compared to the operation value 540. The counter value 536 will increment until the counter value 536 is equal to or greater than the operation value 540, and polling will be initiated. If the execution of the second command takes longer than execution of the first command, the memory device 504 will not be ready for another command. However, if the interface controller 502 receives a value of the status register 532 in which the ready bit 534 indicates the memory device 504 is ready to receive another command, execution of the second command is the same or less than the time of execution of the first command.

To avoid latency in a case in which execution times vary and the second command executes in less time than the first command, the operation value 540 may be set to a value that is most of the execution time of a previous command. For example, the operation value 540 may be set to 95%, 90%, or some other percentage of the counter value 536 at completion of a previous command. Alternatively, the operation value 540 may be set to an average of the operation value 540 and the counter value 536, or an average of the counter values 536 of several previous commands. The above methods of determining the operation value 540 are non-limiting examples, and other methods of determining an operation value are within the scope of the present disclosure. The operation value 540 is used to start polling the memory device 504 after sending a subsequent command. Circuits employing various algorithms for determining an operation value 540 based on one or more previous execution times are within the scope of this disclosure. Additionally, because different types of commands may take significantly different amounts of time to execute, the reduction circuit 505 may implement a dedicated pair of registers corresponding to the counter register 538 and the operation value register 542 for each type of command executed by the memory device 504. In this way, the power savings based on adaptive suspension of polling can be optimized for each type of command.

Figure 6:
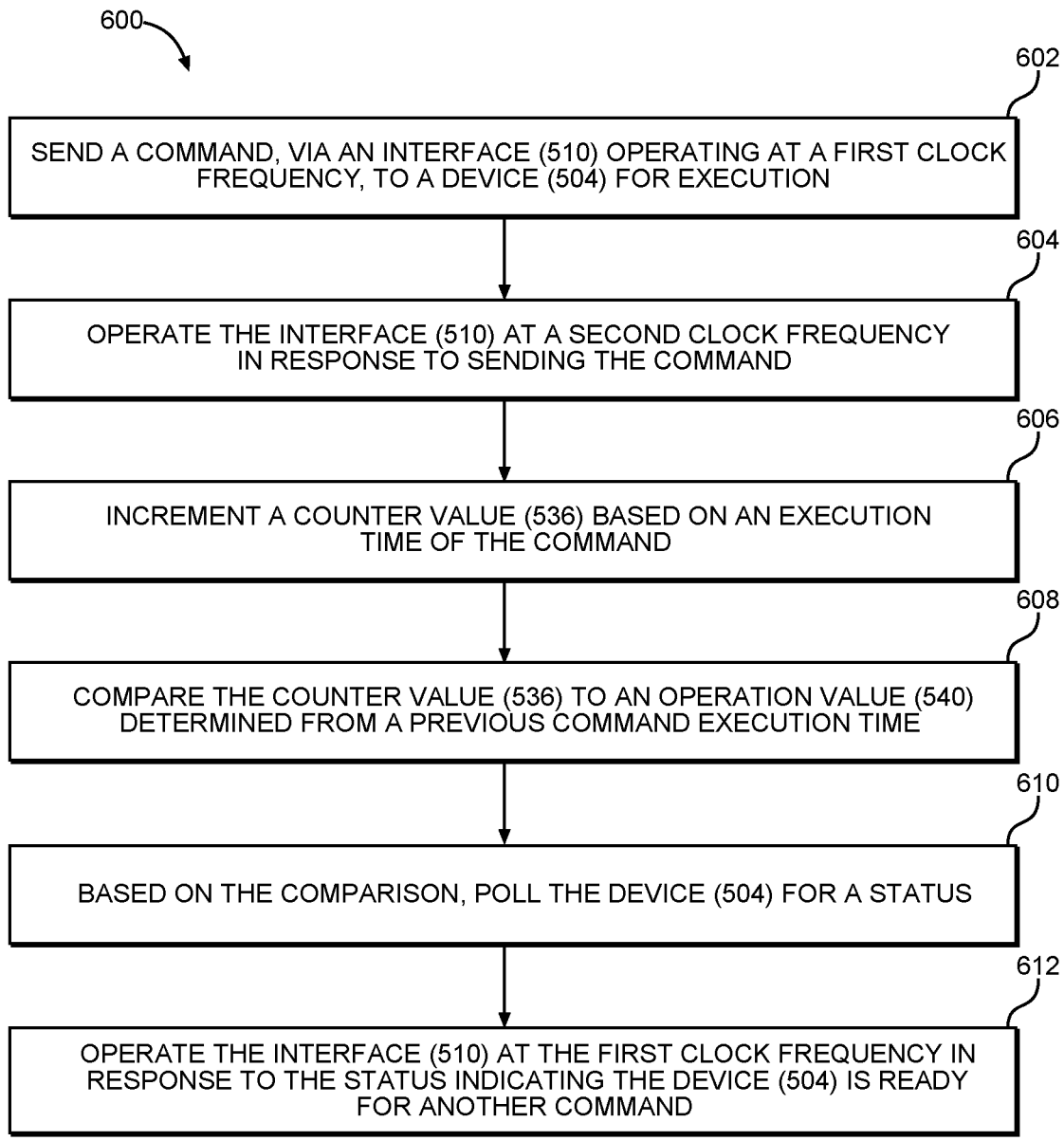
FIG. 6 is a flowchart illustrating an exemplary process for reducing power demands of an interface by scaling clock frequency and adaptively interleaving polling via the interface.

FIG. 6 illustrates an exemplary process 600 of reducing power demands of an interface according to the aspects of clock scaling and interleaving polling as disclosed herein. In particular, the process 600 begins with the control system 514 in the interface controller 502 sending a command, via an interface (e.g., the QSPI interface 510) operating at a first clock frequency, to a device (e.g., the memory device 504) for execution (block 602). The control system 514 operates the interface (e.g., the QSPI interface 510) at a second clock frequency in response to sending the command (block 604). The reduction circuit 505 in the control system 514 increments the counter value 536 in the counter register 538 based on an execution time of the command (block 606). The reduction circuit control 530 in the reduction circuit 505 compares the counter value 536 to the operation value 540 which is determined from a previous command execution time (block 608). Based on the comparison by the reduction circuit control 530, the control system 514 polls the device for a status (i.e., a value of the status register 532) (block 610). The control system 514 operates the interface at the first clock frequency in response to the status indicating the device is ready for another command (block 612).

Figure 7:
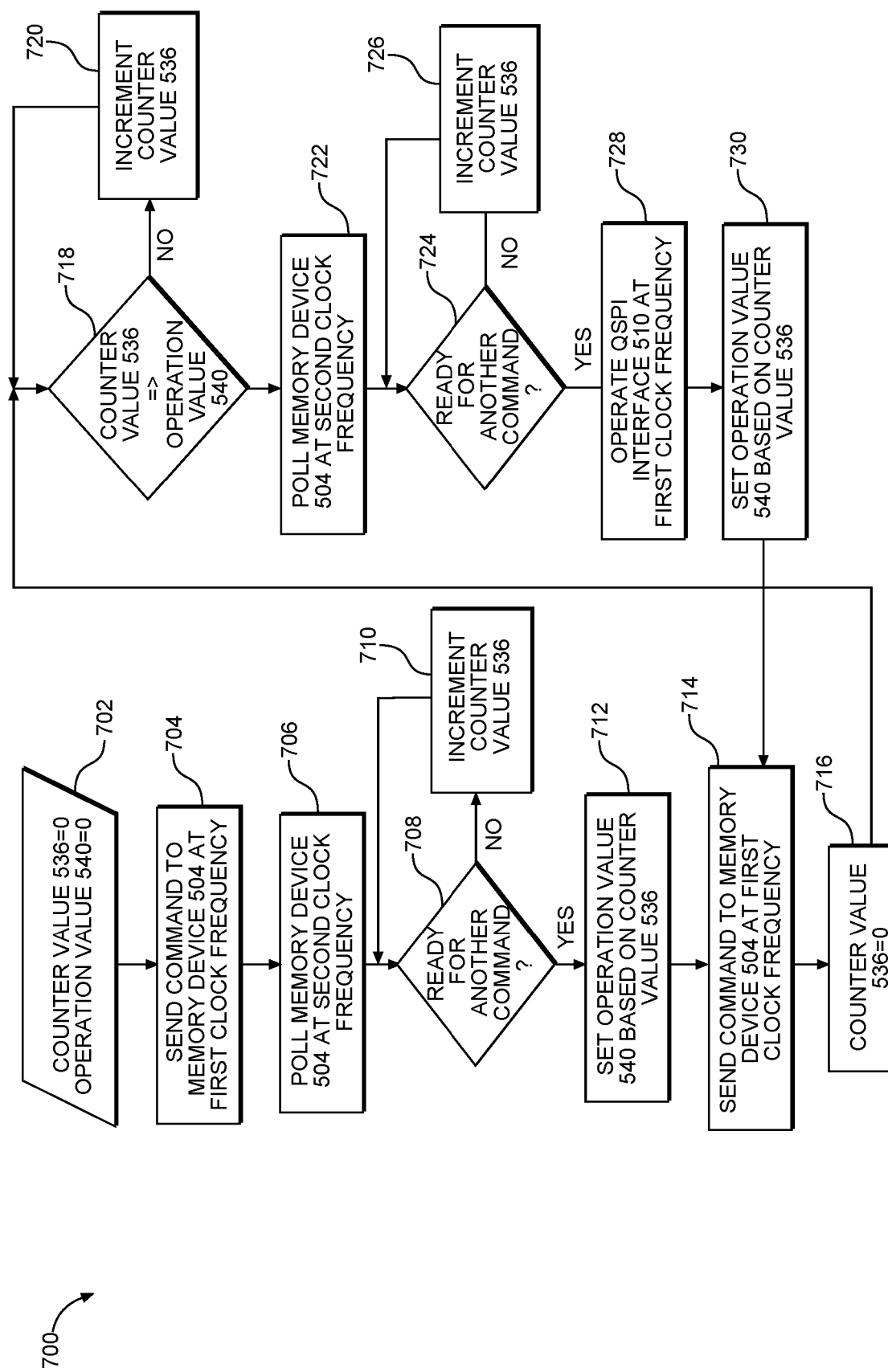
FIG. 7 is a flowchart illustrating an exemplary process of an interface controller including a control system to reduce power consumption in a Quad SPI (QSPI)

FIG. 7 is an exemplary flowchart illustrating a process 700 of the control system 514 including the reduction circuit 505 operating the QSPI interface 510. The process 700 begins after powering on the board 500 with initializing the counter register 538 and the operation value register 542 by resetting each of the counter value 536 and the operation value 540 to "0" (block 702). The process 700 continues with sending a command to the memory device 504 at the first clock frequency (block 704). The control system 514 causes the QSPI interface 510 to poll the memory device 504 while operating at the second clock frequency (block 706). Based on the value of the status register 532 received in response to the polling, the control system 514 determines whether the memory device 504 is ready for another command (block 708). If the memory device 504 is not ready for another command, the counter value 536 in the counter register 538 is incremented (block 710) and the process returns to block 706. Returning to block 708, if the memory device 504 is ready for another command, the operation value 540 in the operation value register 542 is set based on the counter value 536 (block 712). In one example, the operation value 540 may be set equal to the counter value 536. The control system 514 may operate at the first clock frequency while setting the operation value 540.

The process 700 continues by sending another command (i.e., a second command) to the memory device 504 at the first clock frequency (block 714). In response to sending the command, the control system 514 operates the QSPI interface 510 at the second clock frequency. In response to sending the command, the counter register 538 is initialized by setting the counter value 536 to "0" (block 716). The counter value 536 is compared to the operation value 540 (block 718). If the counter value 536 is not equal to or greater than the operation value 540, the counter value 536 is incremented (block 720). Returning to block 718, if the counter value 536 is equal to or greater than the operation value 540, the memory device 504 is polled at the second clock frequency (block 722). Based on the value of the status register 532 received in response to the polling, the control system 514 determines whether the memory device 504 is ready for another command (block 724). If the memory device 504 is not ready for another command, the counter value 536 in the counter register 538 is incremented (block 726) and the process returns to block 724. Returning to block 724, if the memory device 504 is ready for another command, the control system 514 operates the QSPI interface 510 at the first clock frequency (block 728) and sets the operation value 540 in the operation value register 542 based on the counter value 536 (block 730). From block 730, process 700 returns to block 714 and repeats.

Figure 8:
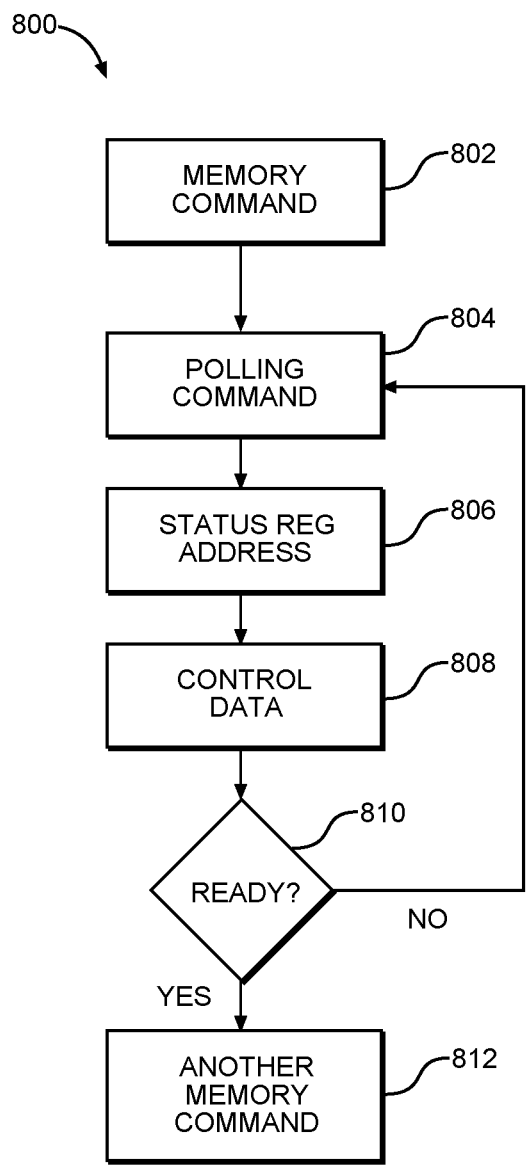
FIG. 8 is a flowchart illustrating an exemplary command and polling sequence between an interface controller and a memory device without adaptive interleaving of polling but with frequency scaling.

FIG. 8 is a flowchart illustrating a command and polling sequence 800 between the interface controller 502 and the memory device 504 on the QSPI bus 508 without implementing the polling interleaving aspect of the reduction circuit 505 disclosed above but with frequency scaling. The sequence 800 begins with the interface controller 502 sending a memory command, such as an erase, read, write, or reset (or another command executable by the memory device 504), to the memory device 504 (block 802). The command may be sent with the interface controller 502 operating at a higher clock frequency, and the interface controller 502 may subsequently operate at a lower clock frequency, as described above. To determine when execution of the memory command is complete, the interface controller 502 begins a polling sequence by sending a polling command to poll a register in the memory device 504 (block 804). An address of the status register 532 is sent to the memory device 504 (block 806), and control data for the polling command is sent following the address (block 808). In response to the polling command, the memory device 504 responds by sending a value of the status register 532 to the interface controller 502 over the QSPI bus 508, and the interface controller 502 determines whether the memory device 504 is ready for another command by checking the ready bit 534 (block 810). If the memory device 504 is found to be not ready for another command, the sequence 800 returns to block 804, where polling is repeated. If the memory device 504 is found to be ready for another command at block 810, the interface controller 502 operates at the first clock frequency and the sequence 800 continues with the interface controller 502 sending another memory command to the memory device 504 (block 812).

Figure 9:
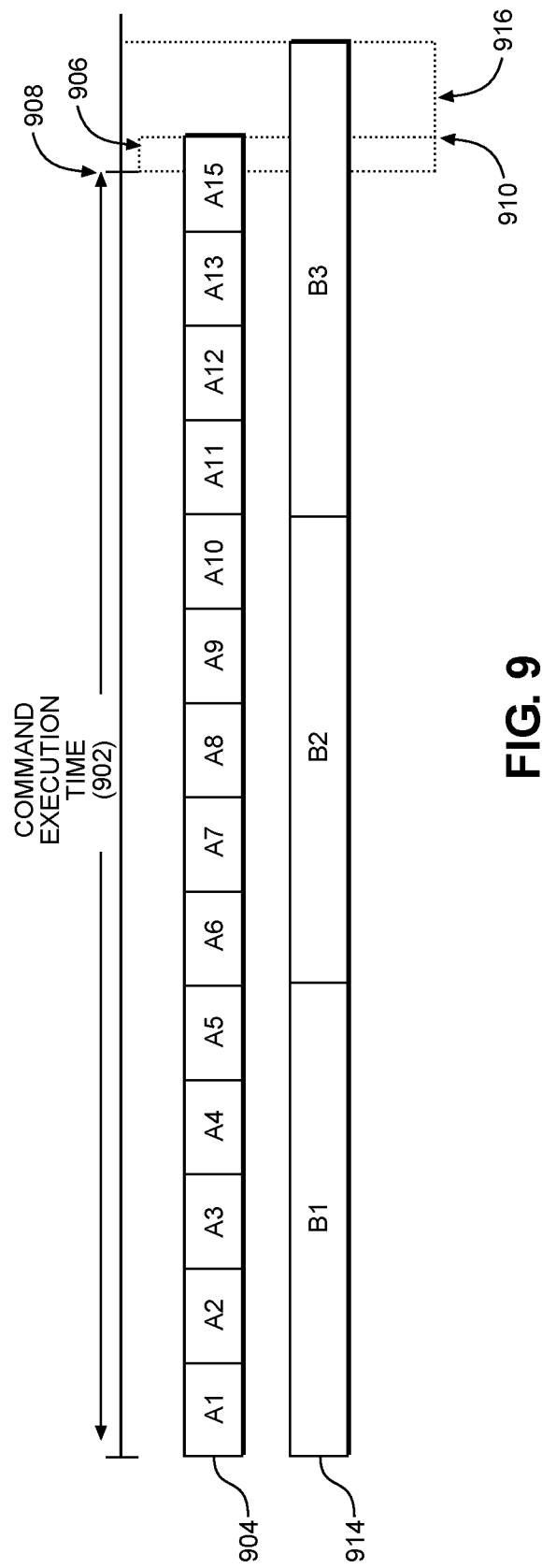
FIG. 9 is a timing diagram comparing polling with clock frequency scaling according to the process in FIG. 6 and without clock frequency scaling.

FIG. 9 is an illustration of the reduction in polling events achieved by operating the QSPI interface 510 at a second clock frequency that is 20% of the first clock frequency at which the QSPI interface 510 operates while sending a command. In this example, a command execution time 902 is a time for the memory device 504 to execute a command. A sequence 904 illustrates of a number of polling events A1-A15 (i.e., as shown in blocks 804-808 in FIG. 8) by the QSPI interface 510 operating according to the first clock frequency. A latency time 906 occurs between the memory device 504 becoming ready for another command at time 908, and a time 910 when the interface controller 502 receives the value of the status register 532 indicating that the memory device 504 is ready. A sequence 914 illustrates of a number of polling events B1-B3 by the QSPI interface 510 operating according to the second clock frequency that is 20% of the first clock frequency. As shown, the reduction in polling events corresponds to the reduction in clock frequency. In other words, because the second clock frequency is 20% of the first clock frequency, the number of polling events while operating at the second clock frequency is 20% of the number of polling events while operating at the first clock frequency. Thus, by implementing the clock scaling aspect of the reduction circuit 505, power consumed by polling events during execution of the command is reduced to 20% of power consumption without implementing clock scaling. An additional latency time 916 due to implementation of clock scaling increases a total latency of the command, but is small in comparison to the total command execution time 902, and may be an acceptable tradeoff for the reduction in power consumption provided by clock scaling.

The interface controller 502, which reduces power consumption of communication interfaces by clock frequency scaling and adaptive interleaving of polling, may be included in any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 10:
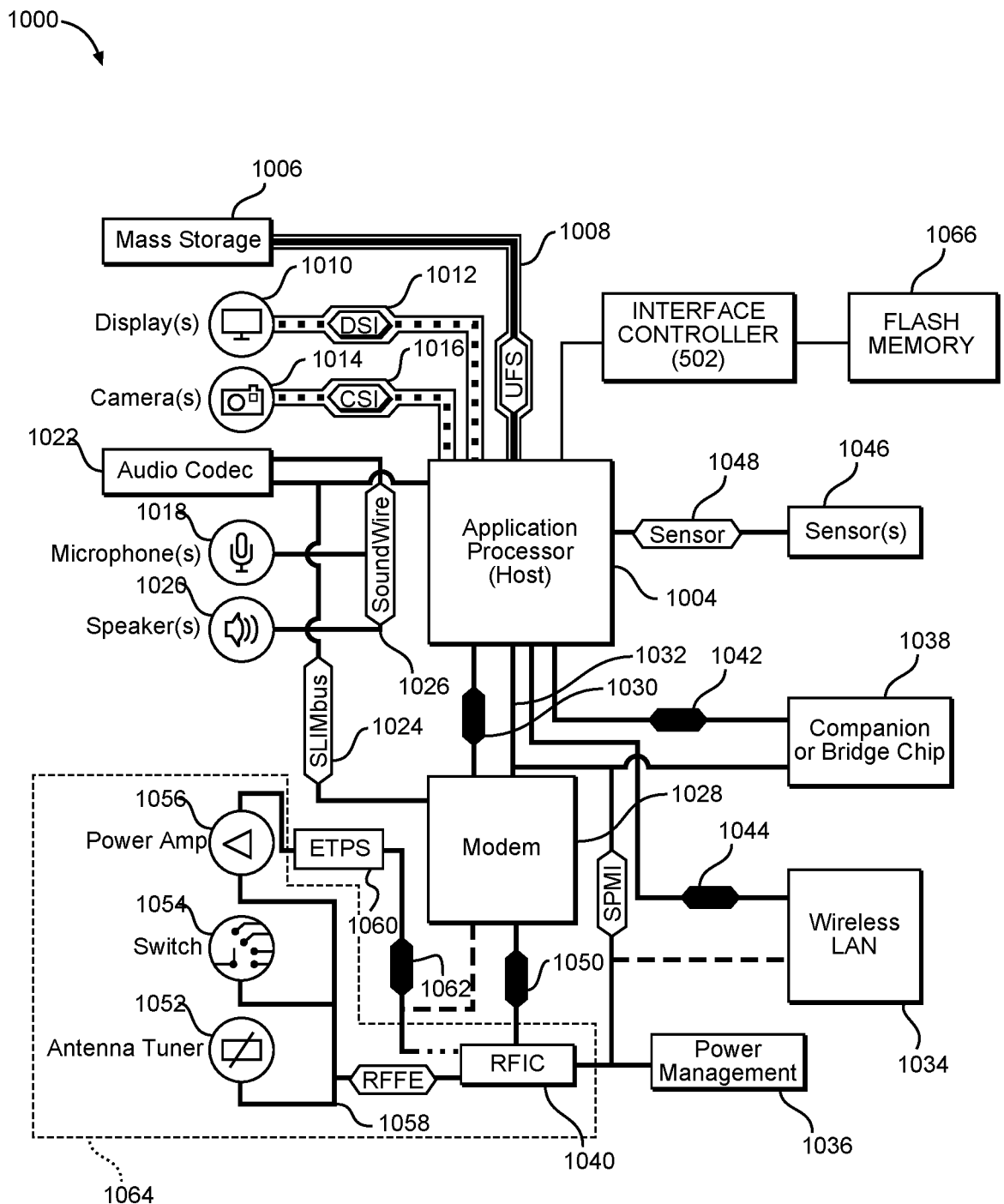
FIG. 10 is a system-level block diagram of an exemplary mobile terminal that can include the interface controller of FIG. 5 operating according to the processes of FIGS. 6 and 7.

In this regard, FIG. 10 is a system-level block diagram of an exemplary mobile terminal 1000 such as a smart phone, mobile computing device tablet, or the like that can employ the interface controller 502 of FIG. 5 operating according to the processes 600 and 700 of FIGS. 6 and 7, respectively.

With continued reference to FIG. 10, the mobile terminal 1000 includes an application processor 1004 (sometimes referred to as a host) that communicates with a mass storage element 1006 through a universal flash storage (UFS) bus 1008. The application processor 1004 may further be connected to a display 1010 through a display serial interface (DSI) bus 1012 and a camera 1014 through a camera serial interface (CSI) bus 1016. Various audio elements such as a microphone 1018, a speaker 1020, and an audio codec 1022 may be coupled to the application processor 1004 through a serial low-power interchip multimedia bus (SLIMbus) 1024. Additionally, the audio elements may communicate with each other through a SOUNDWIRE bus 1026. A modem 1028 may also be coupled to the SLIMbus 1024 and/or the SOUNDWIRE bus 1026. The modem 1028 may further be connected to the application processor 1004 through a PCI or PCIE link 1030 and/or a system power management interface (SPMI) bus 1032.

With continued reference to FIG. 10, the SPMI bus 1032 may also be coupled to a local area network (WLAN) IC (WLAN IC) 1034, a power management integrated circuit (PMIC) 1036, a companion IC (sometimes referred to as a bridge chip) 1038, and a radio frequency IC (RFIC) 1040. It should be appreciated that separate PCI links 1042 and 1044 may also couple the application processor 1004 to the companion IC 1038 and the WLAN IC 1034. The application processor 1004 may further be connected to sensors 1046 through a sensor bus 1048. The modem 1028 and the RFIC 1040 may communicate using a bus 1050.

With continued reference to FIG. 10, the RFIC 1040 may couple to one or more RFFE elements, such as an antenna tuner 1052, a switch 1054, and a power amplifier 1056 through a radio frequency front end (RFFE) bus 1058. Additionally, the RFIC 1040 may couple to an envelope tracking power supply (ETPS) 1060 through a bus 1062, and the ETPS 1060 may communicate with the power amplifier 1056. Collectively, the RFFE elements, including the RFIC 1040, may be considered an RFFE system 1064. It should be appreciated that the RFFE bus 1058 may be formed from a clock line and a data line (not illustrated). The application processor 1004 may also be coupled to the interface controller 502 controlling data transfer between the application processor 1004 and a flash memory device 1066.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A method of interleaved polling on an interface, comprising:
   sending a command via an interface to a device for execution by the device;
   incrementing a counter value to track an execution time of the command;
   comparing the counter value to an operation value determined from a previous command execution time;
   based on the comparison, polling the device for a status; and
   operating the interface at a clock frequency in response to the status indicating that the device is ready for another command.

2. The method of claim 1, further comprising:
   initializing the counter value in response to sending the command.

3. The method of claim 1, wherein:
   comparing the counter value to the operation value further comprises determining whether the counter value is equal to or greater than the operation value; and
   polling the device for the status comprises suspending polling until the counter value is equal to or greater than the operation value.

4. The method of claim 1, further comprising:
   setting the operation value based on the counter value.

5. The method of claim 4, wherein:
   setting the operation value comprises setting the operation value to a new operation value equal to an average of the counter value and the operation value.

6. The method of claim 4, wherein:
   setting the operation value comprises setting the operation value to a new operation value in a range of 50% to 90% of the counter value at completion of the command.

7. The method of claim 1, wherein:
   sending the command via the interface comprises sending the command via a serial interface.

8. The method of claim 7, wherein:
   sending the command via the serial interface comprises sending the command via a serial peripheral interface (SPI) or a Quad serial peripheral interface (QSPI) to a memory device.

9. The method of claim 1, wherein:
   sending the command to the device comprises sending the command to a NAND FLASH memory device or a NOR FLASH memory device.

10. The method of claim 1, wherein:
    sending the command to the device comprises sending one of a read command, a write command, an erase command, and a reset command.

11. An apparatus comprising an interface controller, comprising:
    an interface configured to couple to a wire-based communication link; and
    a control system coupled to the interface, the control system configured to:
        send a command via the interface to a device for execution by the device;
        increment a counter value to track an execution time of the command;
        compare the counter value to an operation value that is based on a previous execution time of the command;
        based on the comparison, poll the device for a status indicating completion of the command; and
        operate the interface at a clock frequency in response to the status indicating that the device is ready for another command.

12. The apparatus of claim 11, wherein the control system further comprises a counter register storing the counter value, and the control system is further configured to initialize the counter register with a first counter value in response to sending the command.

13. The apparatus of claim 11, wherein the control system is further configured to:
    compare the counter value to the operation value to determine whether the counter value is equal to or greater than the operation value; and
    suspend polling until the counter value is equal to or greater than the operation value.

14. The apparatus of claim 11, wherein the control system further comprises an operation value register; and the control system is further configured to set the operation value in the operation value register based on the counter value at the completion of the command.

15. The apparatus of claim 14, wherein the control system is further configured to set the operation value in the operation value register to a new operation value equal to an average of the operation value and the counter value at the completion of the command.

16. The apparatus of claim 14, wherein the control system is further configured to set the operation value in the operation value register to a new operation value in a range of 50%-90% of the counter value at the completion of the command.

17. The apparatus of claim 11, wherein the control system further comprises:
    a counter register to store the counter value; and
    an operation value register to store the operation value.

18. The apparatus of claim 11 comprising a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

* * * * *